(12) United States Patent
Roediger et al.

(10) Patent No.: US 7,783,984 B2
(45) Date of Patent: Aug. 24, 2010

(54) VOICE XML WEB CONSOLE

(75) Inventors: Karl Christian Roediger, Diehlheim (DE); Ben-Shaul Yair, Hadera (IL); Arkadi Kagan, Petach-Tikva (IL); Alexander Rosenbaum, Raanana (IL); Li Gong, Foster City, CA (US); Matthias Winkler, Dresden (DE); Samir Rayiani, Sunnyvale, CA (US); Christoph Lessmoellmann, Kilmore (AU)

(73) Assignee: SAP AG, Walldorf (DE)

( * ) Notice: Subject to any disclaimer, the term of this patent is extended or adjusted under 35 U.S.C. 154(b) by 583 days.

(21) Appl. No.: 11/663,396

(22) PCT Filed: Sep. 21, 2004

(86) PCT No.: PCT/EP2004/052257

§ 371 (c)(1),
(2), (4) Date: Oct. 30, 2007

(87) PCT Pub. No.: WO2006/032302

PCT Pub. Date: Mar. 30, 2006

(65) Prior Publication Data

US 2008/0065984 A1 Mar. 13, 2008

(51) Int. Cl.
*G06F 15/00* (2006.01)
*G06F 13/00* (2006.01)
(52) U.S. Cl. .................................. 715/765; 715/763
(58) Field of Classification Search ......... 715/763–765, 715/740–743, 851–853, 780, 551, 553; 709/229, 709/310
See application file for complete search history.

(56) References Cited

U.S. PATENT DOCUMENTS

2002/0194388 A1* 12/2002 Boloker et al. ............... 709/310
2004/0181461 A1* 9/2004 Raiyani et al. ................ 705/26

\* cited by examiner

*Primary Examiner*—Kevin Nguyen
(74) *Attorney, Agent, or Firm*—Blakely, Sokoloff, Taylor & Zafman, LLP

(57) ABSTRACT

The invention provides a method and apparatus, including computer program products, for interfacing communication between a warehouse management system and a portable device, the device being adapted for processing voice XML data, the method comprising: receiving, from the warehouse management system, GUI screen data comprising visual content; generating voice XML data one the basis of the visual content, the voice XML data comprising at least one portion which is representative of voice information; and transmitting the generated voice XML data to the device.

19 Claims, 6 Drawing Sheets

VOICE XML WEB CONSOLE

This is a non-provisional application of International Application No. PCT/EP2004/052257, filed Sep. 21, 2004.

FIELD OF THE INVENTION

This application relates to warehouse management in general and in particular to web consoles for communication with portable devices used in warehouse management applications.

BACKGROUND

Distribution centers today face the twin challenges of smaller individual order sizes and significantly larger overall order volumes. A variety of solutions have emerged to improve the speed and accuracy of warehouse operations such as picking and packing.

BRIEF DESCRIPTION OF THE DRAWINGS

Embodiments of the invention are further described in connection with the drawings, in which.

DETAILED DESCRIPTION

Figure 1:
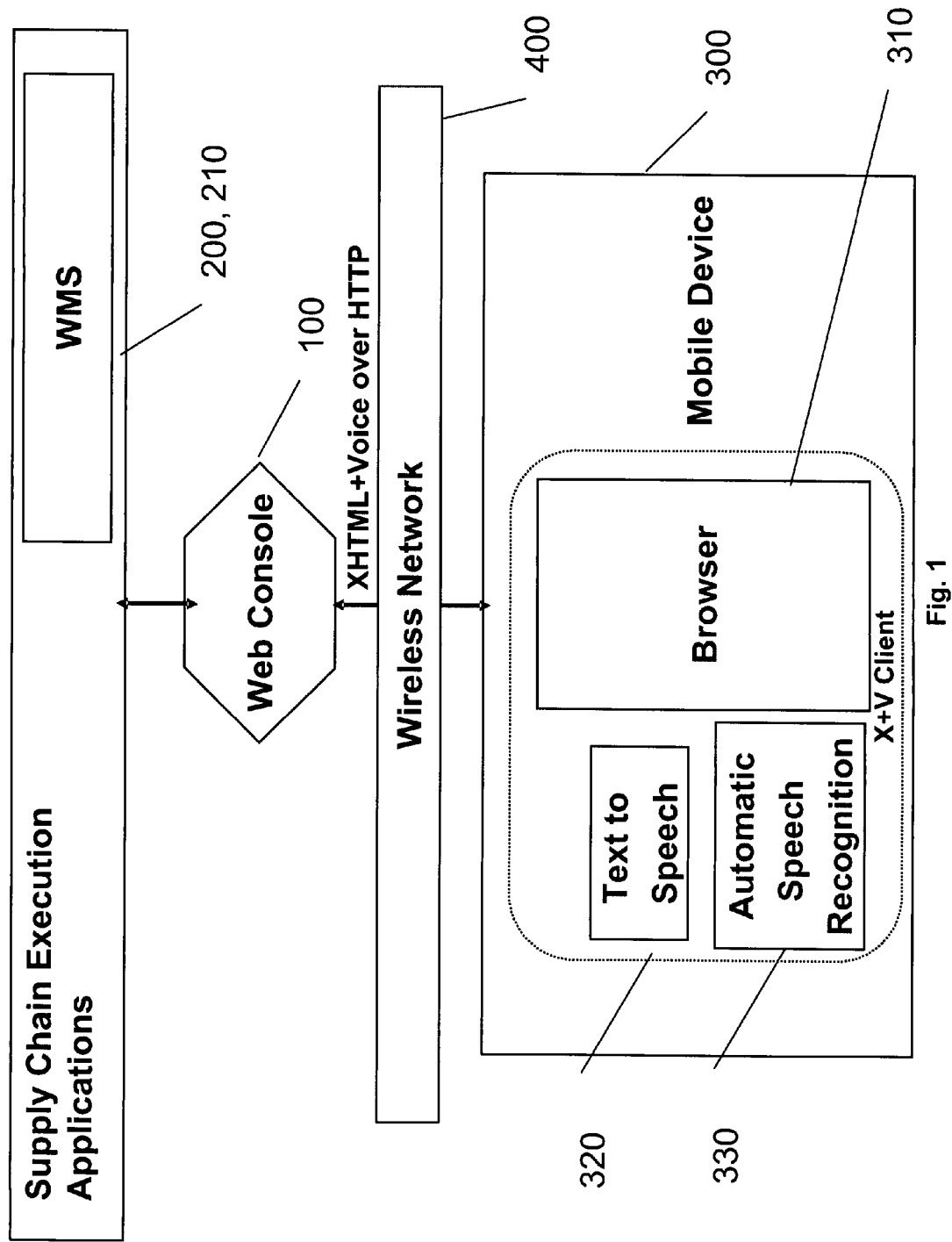
FIG. 1 illustrates an overview of the warehouse management application wherein the invention is used.

According to a first aspect of the invention, there is provided a method of interfacing, in a web-enabled console application, communication between a warehouse management system and a portable device, the device being adapted for processing voice XML data, the method comprising:

receiving, from the warehouse management system, GUI screen data comprising visual content;

generating voice XML data one the basis of the visual content, the voice XML data comprising at least one portion which is representative of voice information; and transmitting the generated voice XML data to the portable device.

According to a further aspect of the invention, there is provided a method of receiving data by a portable device from a web-enabled console application, the web-enabled console application being coupled with a warehouse management system, the portable device being adapted for processing voice XML information, the method comprising:

receiving voice XML data, the voice XML data comprising at least one portion which is representative of voice information, and being generated on the basis of GUI screen data comprising visual content;

the GUI screen data being transmitted by a web-enabled console application of the warehouse management system.

Generating voice XML data may comprise transforming text data to speech, which is to be outputted by the portable device.

The portable devices may include at least one of laptop, PDA, mobile phone, barcode scanner, RFID tag reading device, and smart phone.

The transmission may be performed on basis of an internet protocol.

The transmission may also be performed via a wireless network.

According to one embodiment of the invention RFID tag information is read by a portable RFID tag reading device and transmitted to the web-enabled console application.

RFID tag information may be modified in the tag upon an instruction transmitted via the web-enabled console application to the portable RFID tag reading device.

The at least a portion of the voice XML data may be displayed on a web browser of the portable device.

Voice information may be sent from the portable device to the web-enabled console application in the form of voice XML data.

Thus, after a voice message has been recognized and decoded by the voice component and translated to a string, it is, from the application point of view, the same as keyboard input which is then filled in appropriate edit fields, the information will be analyzed in a system and the appropriate response will be sent to the portable device.

A plurality of communication protocols for communicating with a portable device may be supported by the web-enabled console application.

GUI screen data may be mapped to display data according to a selected one of the communication protocols.

Optical bar code information may be scanned by the portable device and transmitted to the web-enabled console application.

Generating voice XML data on the basis of the visual content data may be performed in runtime.

The communication may comprise voice data to be outputted from the portable device.

The portable device may be part of an RFID system.

The web-enabled console application may be adapted for transmitting multiple activities in one data message to the RFID system.

The RFID system may be adapted for simultaneous and instantaneous scanning of multiple tags, where each tag refers to a specific activity in a warehouse.

The RFID system may further be adapted for determining the respective activity to which a tag refers.

The RFID system may further be adapted for splitting a data message into multiple activities, assigning the activities to multiple scanning, aggregating and transmitting the activities to the web-enabled console application.

The RFID system may further be adapted for updating an external system with respect to a completed activity.

In particular, the invention comprises also computer systems for performing the inventive methods.

Furthermore, the invention comprises computer-readable storage media comprising program code for performing the inventive methods, when loaded into a computer system.

One of the advantages is that customers that want to use voice recognition in high-volume warehouse operations can now use a web console which supports multimodality—the combination of voice input/output, barcode scanning, keypad input as well as display output will give the required result of high throughput.

In FIG. 1, an overview of a representation of the communication facilities in a warehouse environment is given. It is demonstrated how a browser in a portable device that provides for display and voice recognition, communicates with a supply chain applications such as a warehouse management system (WMS) using the console interface.

This embodiment of the invention uses two components of voice technology, namely text-to-speech (TTS) and automatic speech recognition (ASR). TTS systems take input from a text stream and render human-sounding speech output. ASR systems recognize human voice and convert it to speech input for backend systems. ASR systems may or may not require "training"—a process of preparing the system to recognize a user's voice/accent.

Furthermore, voice recognition can be client-based or server-based, wherein the TTS/ASR processes are executed on the server while voice data is shipped back and forth between the client and the server over a wireless network connection.

In a voice-enabled warehouse picking operation, a user (a picker) carries an RF mobile device connected to a headset (a speaker/microphone combination). The user receives instructions and feedback through the speaker on the headset, as well as through the display of the mobile device. He uses the microphone to provide input to the backend system. The RF device may also have other input devices such as a barcode scanner or a keypad.

Voice-only picking and confirmation—In a high-speed picking environment where the size of material being picked is small and the speed of picking is high (such as in a gravity-flow area), hands-free usage is essential. In this case, the user receives instructions through his headset (from a backend system, via a console and a TTS engine). As the user completes each step, he speaks into the headset and verbally confirms the transaction. The ASR system recognizes the voice inputs and converts them into inputs for the backend system.

Voice-picking with barcode/keypad confirmation—In other picking environments where the speed is much slower, the user receives instructions through the headset, but can confirm a pick using the barcode scanner. Alternately, they may confirm the pick using the keypad on the mobile device.

Web-enabled SAPconsole application 100 is located logically between a warehouse management system 200 and a number of portable devices 300, from which only one is shown. The SAPconsole application 100 is provided by SAP Aktiengesellschaft, Walldorf, Germany. Portable device 300 may be a PDA, a barcode scanner, or an RFID tag reader. Connection between web-enabled SAPconsole application 100 and the portable devices 300 is provided by a wireless network 400.

Portable device 300 is equipped, in this example, with a web browser component 310, and TTS component 320, as well as an ASR component 330. Components 310-330 work as XHTML+voice client in the web frame work.

The XHTML+voice standard brings spoken interaction to standard web content by integrating technologies XHTML and voice XML. It is designed for web clients that support visual and spoken interaction. The standard supports speech synthesis, speech dialogs, command and control, speech grammars, and the ability to attach voice handlers for responding to specific HTML events. Voice interaction features are integrated directly with HTML and Cascading Style Sheets, and can consequently be used directly within XHTML content.

A variety of hardware devices along with voice-recognition software can be used and is able to integrate with the web-enabled SAPconsole application 100 using this framework.

In the following, the function of the embodiment is described. After the web-enabled SAPconsole application 100 gets screens from the warehouse management system for display it converts the controls to the correct format (i.e., HTML page sent to the browser).

By adding fields from specific known name space to any screen, filling the fields with specific syntax allows the web-enabled SAPconsole application 100 to build a string which will be included in the voice XML data in runtime.

The syntax may comprise free text, instructions to take specific text fields, or to get data from output fields. Also pointers to text fields are allowed.

On the portable device 200 side, the browser 310, which support Voice XML, gets the data, display the relevant data and pass the text-to-speech to the TTS component 320. When voice is entered for verification purposes, the voice is passed to the ASR component 330 where it is translated to text and sent to the browser 310 as the input string for the current field.

Figure 2:
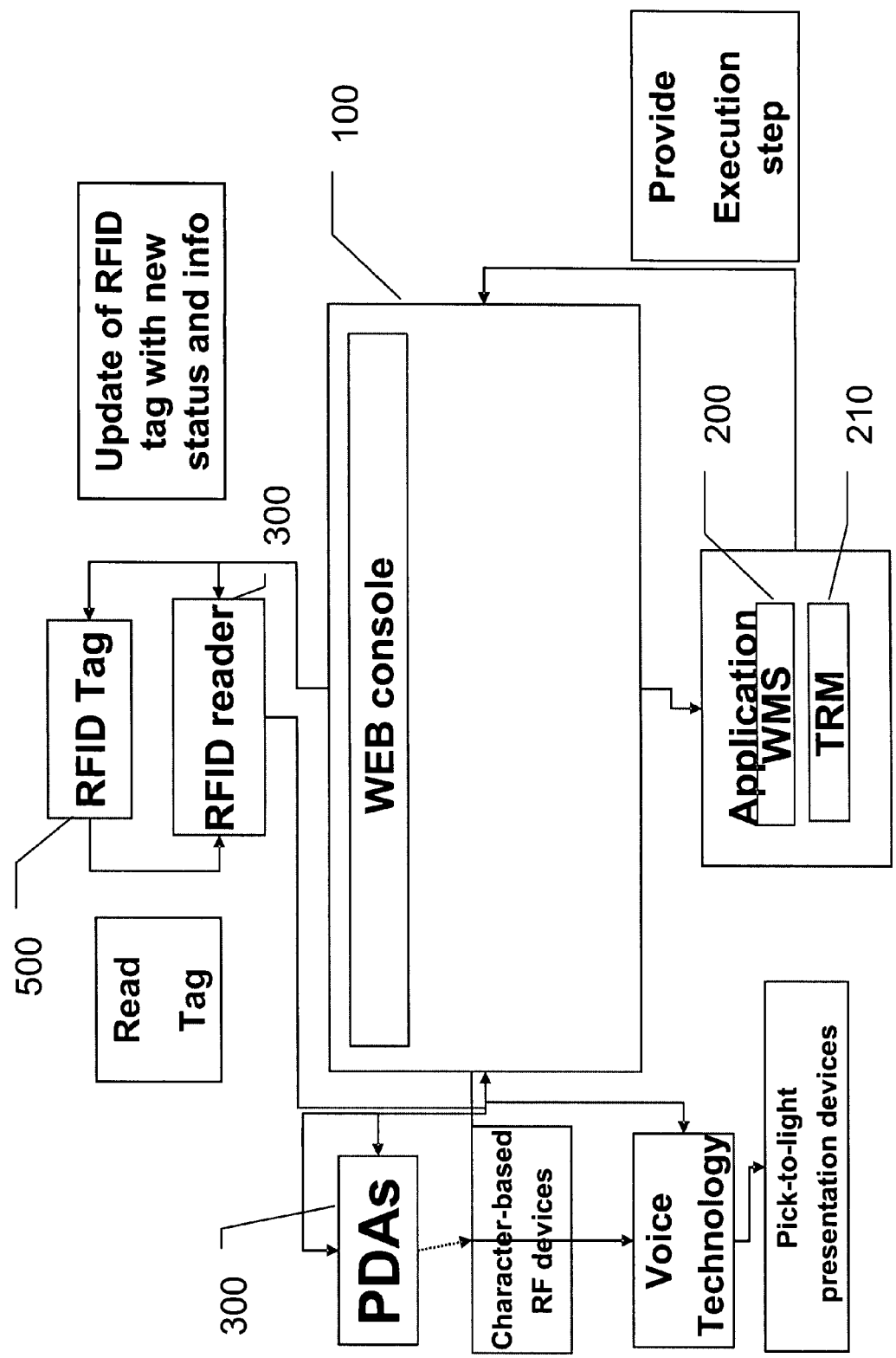
FIG. 2 illustrates a further embodiment of the present invention.

The invention may be applied on a radio frequency identification (RFID) system. FIG. 2 provides an overview of such a system. The web-enabled SAPconsole application 100 is again located logically between a WMS application 300, which comprises a task and resource management (TRM) system 210. WM/TRM system 200, 210 provides an execution step to the web-enabled SAPconsole application 100. This web-enabled SAPconsole application 100 provides for communication with many different portable devices in the warehouse. These devices 300 include, but are not limited to, RFID tag readers, PDAs, character-based RF devices. For communicating with these devices, the web-enabled SAPconsole application 100 is adapted for communication in a variety of communication protocols supporting different standards and devices, such as audio/visual communication protocols, (character-based, WinCE, voice recognition) ASRs. Functionalities like data mapping may be provided, as well as access to a data base.

Taking reference to FIGS. 3A to 3D, the function of the embodiment is described for a scenario which comprises updating an RFID tag 500 with new status and info data by use of a portable RFID tag reader.

Figure 3A:
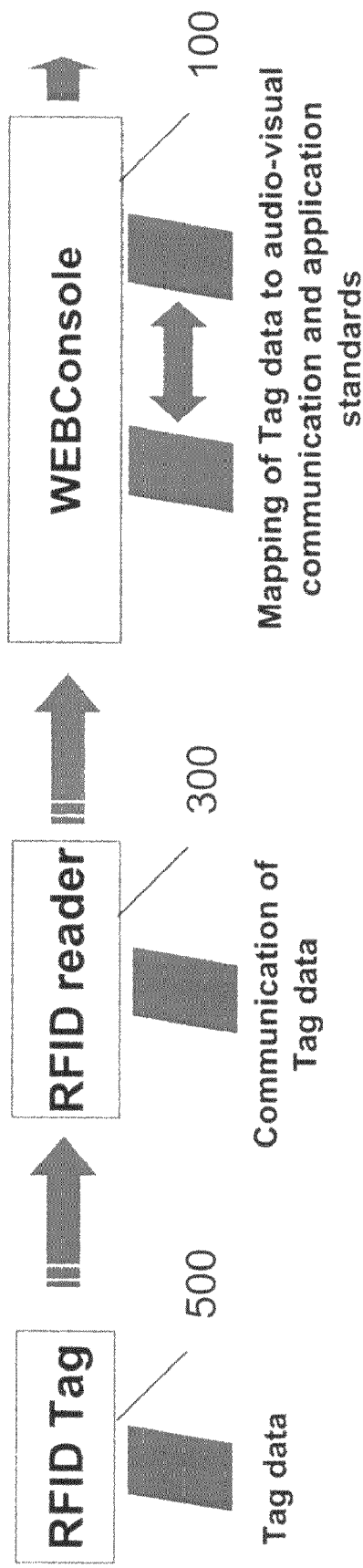
FIGS. 3A-D illustrates a system for implementing the invention according to FIGS. 1 and 2.

The RFID tag reader 300 reads an RFID smart tag 500, which is applied on an item in the warehouse, see FIG. 3A. The RFID tag reader 300 then transmits, via WLAN 400, the read information to the web-enabled SAPconsole application 100, which supports several standards of communication protocols/bandwidths and RFID smart tags 500 of different manufactures. The web-enabled SAPconsole application 100 maps the received data to data according to different audio/visual communication and application standards, in order to enable different audio-visual devices to display the RFID smart tag 500 information content for confirmation by the user and in order to format the tag 500 information for different applications.

Figure 3B:
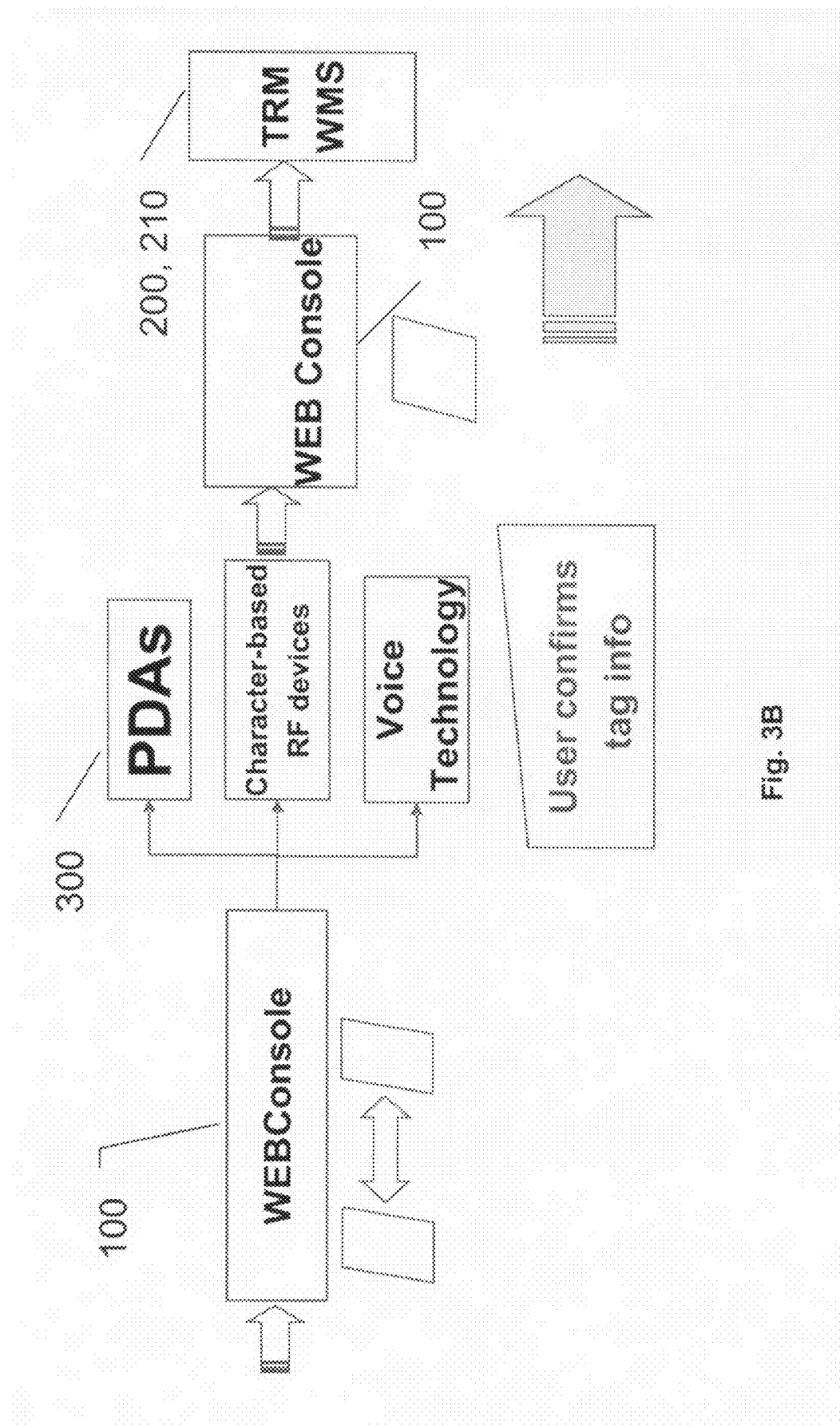

Then, the smart tag 500 info is transmitted to a handheld device 300 or passed to a voice recognition system enabling the user to confirm the identification, see FIG. 3B. Upon confirmation the information is passed, via web-enabled SAPconsole application 100, to the application such as TRM, which will then check the next required execution step (task) to be performed on this item.

Figure 3C:
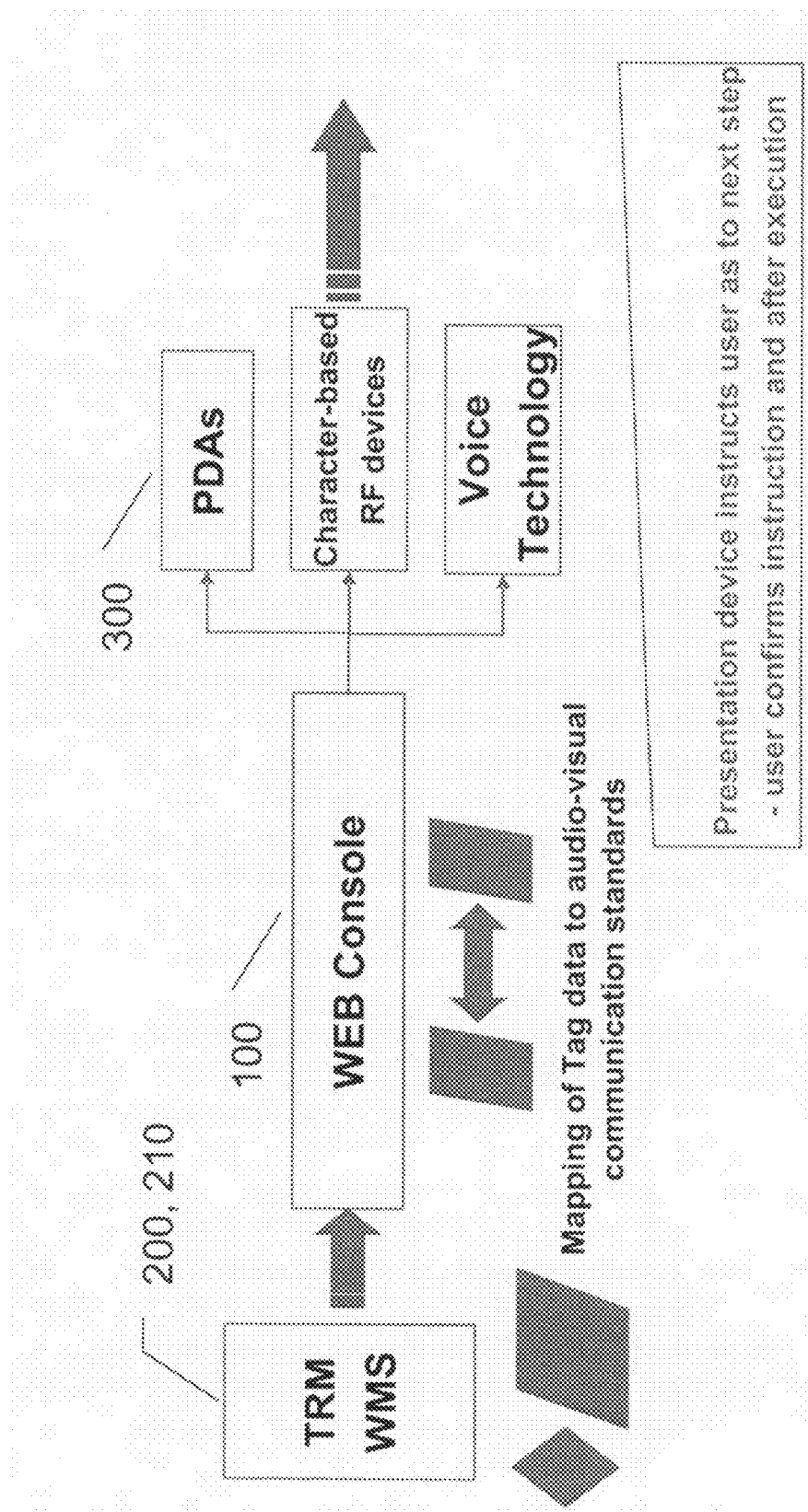

The next task is then given from TRM to the web-enabled SAPconsole application 100 for audio-visual presentation to the user with an instruction as how to proceed, see FIG. 3C.

Figure 3D:
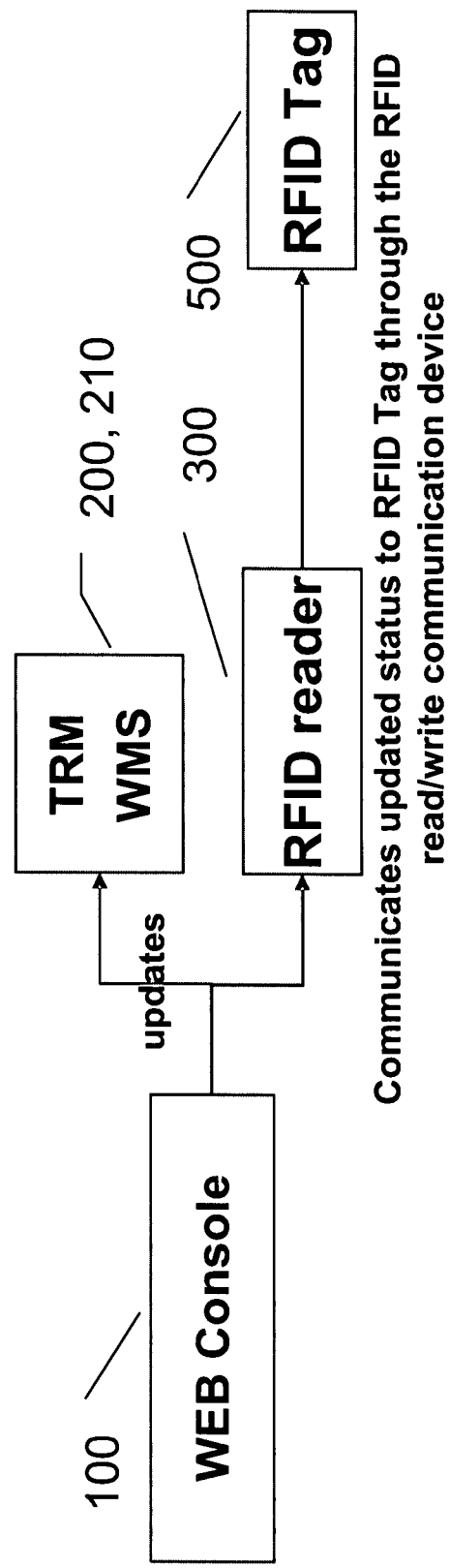

Upon execution confirmation, the smart tag 500 is updated as to its new status, see FIG. 3D.

The usage of RFID technology is enabled though an integrated middleware that reads and updates RFIDs, and integrates this with display and audio (voice recognition) capability together with mapping to/from application will enable totally new automated warehouse/fulfillment center processes—herewith a few examples:

A worker in the warehouse takes a pallet with a smart tag 500 with a forklift—the smart tag 500 is read by the RFID communication device 300 and the info sent to the web-enabled SAPconsole application 100—The web-enabled SAPconsole application 100 then sends the smart tag 500 content information to the worker's portable audio or visual presentation device 300 which the worker then can confirm. Upon confirmation the information is sent by console to TRM—TRM then sends back the task for this pallet such as put away—the task is then displayed (as today already) on the presentation device for the worker to execute. After execution the worker either confirms the task (by audio or by pressing a button) or another bin ID tag 500 will confirm automatically that this pallet as expected has arrived at the required put away bin location. After completion of the execution the smart tag 500 is updated by web-enabled SAPconsole application 100 as to the new status (for example WMS may assign through the web-enabled SAPconsole application 100—a status such as under quality control).

Another scenario for example is that a worker has just finished a task in a particular working area—a forklift mounted smart tag 500 reading device communicates with the web-enabled SAPconsole application 100 and web-enabled SAPconsole application 100 checks with its own new database execution jobs in queue received from TRM—if any smart tags 500 in the vicinity are en queue—The web-enabled SAPconsole application 100 will automatically arrange for this task interleaving opportunity and advise the forklift driver to take this particular pallet and move it to say the picking area.

Further, web-enabled SAPconsole application 100 is capable of sending multiple activities in one message from the WM/TRM system to the RFID system.

The usage of an RFID system is adapted for the simultaneous, instantaneous scanning of multiple tags, where each tag refers to the confirmation of a specific action, e.g. a confirmation of a picking action, and where the RFID system has the task to figure out which tag is belonging to which action, so is doing a buffering/sorting/filtering/assignment/aggregation and bulk back confirmation to the WM/TRM system.

In addition, the RFID system can act for a subdivision of the sent message produced through the web-enabled SAPconsole 100. So it can split it into multiple actions, assigns them to multiple RFID scans, aggregates after scanning the confirmation and sends the completed activity through web-enabled SAPconsole 100 back to the WM/TRM system.

In addition, the RFID system can then independently from the web-enabled SAPconsole 100 update on the completed activity other systems, like for example business intelligence systems for analytics purposes or tracking systems that do a continuous monitoring of activities and backtracking of goods.

The RFID smart tags 500 may comprise as information the identification and/or the URL (uniform resource locator) where all information to the respective RFID is stored.

Further, RFID tags may be provided on the equipment like the forklifts, such that the equipment can be identified using the RFID tag. Then, by reading the RFID tag during operations of the equipment, the operations can be associated with the respective equipment.

In order to provide additional reliability, a bar code may be provided on the item in addition. Thus, if an RFID is not recognizable, the bar code may be explored using a barcode reading device.

All these technologies are usable in combination or as a sole technology.

As an example, a user is enabled to run a transaction on a barcode scanner, where the numbers of items in the warehouse are scanned automatically by an RFID tag reader 300, but may be a material verification field is inputted through a scan. If the system wants to alert the person to do an empty stock check in the warehouse, there can be a voice driven task, that requires a yes/no, during he drives away from the bin.

In a particular embodiment, every instruction to the user is through voice and visual display, whereas the scans are performed by use of RFID devices.

The web-enabled SAPconsole application 100 supports different tag manufacturer's standards. The data mapping may comprise smart tag 500 to application, and smart tag application to presentation devices, such as character based RF, WinCE, HTML, voice recognition.

RF communication standards which are supported may be one or more of VHF, UHF bands, and microwave frequency bands.

The design of the present invention allows users of known systems to upgrade their console interfaces, set the relevant displayer and add new RF devices with those types of browsers and start working with voice instructions.

The user should add to any of the screens he uses, the new fields which will contain the relevant voice instructions in the specific syntax that will allow him to send static and dynamic data which is displayed on the screen in runtime.

The present techniques can be implemented in digital electronic circuitry, or in computer hardware, firmware, software, or in combinations of them. Apparatus of the invention can be implemented in a computer program product tangibly embodied in a machine-readable storage device for execution by a programmable processor. Method steps according to the invention can be performed by a programmable processor executing a program of instructions to perform functions of the invention by operating on the basis of input data, and by generating output data. The invention may be implemented in one or several computer programs that are executable in a programmable system, which includes at least one programmable processor coupled to receive data from, and transmit data to, a storage system, at least one input device, and at least one output device, respectively. Computer programs may be implemented in a high-level or object-oriented programming language, and/or in assembly or machine code. The language or code can be a compiled or interpreted language or code. Processors may include general and special purpose microprocessors. A processor receives instructions and data from memories, in particular from read-only memories and/or random access memories. A computer may include one or more mass storage devices for storing data; such devices may include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by or incorporated in ASICs (application-specific integrated circuits).

The computer systems or distributed computer networks as mentioned above may be used, for example, for producing goods, delivering parts for assembling products, controlling technical or economical processes, or implementing telecommunication activities.

To provide for interaction with a user, the invention can be implemented on a computer system having a display device such as a monitor or LCD screen for displaying information to the user and a keyboard and a pointing device such as a mouse or a trackball by which the user can provide input to the computer system. The computer system can be programmed to provide a graphical or text user interface through which computer programs interact with users.

A computer may include a processor, memory coupled to the processor, a hard drive controller, a video controller and an input/output controller coupled to the processor by a processor bus. The hard drive controller is coupled to a hard disk drive suitable for storing executable computer programs, including programs embodying the present technique. The I/O controller is coupled by means of an I/O bus to an I/O interface. The I/O interface receives and transmits in analogue or digital form over at least one communication link. Such a communication link may be a serial link, a parallel link, local area network, or wireless link (e.g. an RF communication link). A display is coupled to an interface, which is coupled to an I/O bus. A keyboard and pointing device are also coupled to the I/O bus. Alternatively, separate buses may be used for the keyboard pointing device and I/O interface.

Other embodiments are in the scope of the following claims.

The invention claimed is:

1. A method of interfacing, in a web-enabled console application, to communicate between a warehouse management system and a portable device, the method comprising:
   receiving, from the warehouse management system, graphical user interface (GUI) screen data comprising visual content;
   generating voice extensible markup language (XML) data based on the visual content by a computer system, the voice XML data including at least one portion which is representative of voice information;
   transmitting the generated voice XML data to the portable device;
   reading a radio frequency identification (RFID) tag information with the portable device;
   transmitting the information to the web-enabled console application; and
   modifying the RFID tag information responsive to an instruction transmitted via the web enabled console application to the portable device.

2. The method of claim 1, wherein generating voice XML data comprises transforming text data to speech, the speech to be outputted by the portable device.

3. The method of claim 2, wherein the portable device is one of a laptop, personal digital assistant (PDA), mobile phone, barcode scanner, radio frequency identification (RFID) tag reading device, and smartphone.

4. The method of claim 1, wherein transmitting comprises: performing an interne protocol transaction.

5. The method of claim 1, wherein the transmission is performed via a wireless network.

6. The method of claim 1 further comprising:
   sending voice information from the portable device to the web-enabled console application in the form of voice XML data.

7. The method of claim 1 further comprising:
   supporting a plurality of communication protocols for communicating with a portable device in the web-enabled console application.

8. The method of claim 7 further comprising:
   mapping GUI screen data to display data according to a selected one of the communication protocols.

9. The method of claim 1 further comprising:
   scanning optical bar code information with the portable device; and
   transmitting the optical bar code information to the device to the web-enabled console application.

10. The method of claim 1, wherein generating voice XML data comprising:
    the voice XML data at runtime.

11. The method of claim 1 wherein the portable device is part of a radio frequency identification (RFID) system.

12. The method of claim 11, wherein further comprising:
    creating a single data message to transmit multiple activities in a warehouse to the RFID system.

13. The method of one of claim 11 further comprising:
    simultaneously and instantaneously scanning multiple tags, where each tag refers to a specific activity.

14. The method of claim 13 further comprising:
    determining the respective activity to which a tag refers.

15. The method of one of claim 13 further comprising:
    splitting a data message into multiple activities;
    assigning the activities to multiple scans;
    aggregating confirmation for the activities; and
    transmitting the confirmations to the web-enabled console application.

16. The method of claim 15, wherein further comprising:
    updating an external system with respect to a completed activity.

17. A method of receiving data by a portable device from a web-enabled console application, the web-enabled console application being coupled to a warehouse management system, the method comprising:
    receiving voice XML data by the portable device, the voice XML data including at least one portion which is representative of voice information, and being generated on the basis of graphical user interface (GUI) screen data from a web-enabled console application of the warehouse management system, the screen data having visual content;
    reading a radio frequency identification (RFID) tag information by the portable device;
    transmitting the information to the web-enabled console application; and
    modifying the RFID tag information responsive to an instruction transmitted via the web-enabled console application to the portable device.

18. The method of claim 17 further comprising:
    displaying at least a portion of the voice XML data on a web browser of the portable device.

19. A system comprising:
    a web console;
    a voice converter associated with the web console executed by a computer system, the web console to convert visual content to voice extensible markup language (XML) data; and
    a plurality of portable devices capable of wireless communication with the web console, to receive the voice XML data from the web console, each of the plurality of portable devices to read radio frequency identification each of (RFID) tag information, transmit the information to the web console, and modify the RFID tag information responsive to an instruction transmitted via the web console to each of the plurality of portable devices.

* * * * *

UNITED STATES PATENT AND TRADEMARK OFFICE
CERTIFICATE OF CORRECTION

| | | |
|---|---|---|
| PATENT NO. | : 7,783,984 B2 | Page 1 of 1 |
| APPLICATION NO. | : 11/663396 | |
| DATED | : August 24, 2010 | |
| INVENTOR(S) | : Karl Christian Roediger et al. | |

It is certified that error appears in the above-identified patent and that said Letters Patent is hereby corrected as shown below:

Column 7, Claim 4, line 46, please delete "interne" and insert -- internet --.

Signed and Sealed this
Fourteenth Day of February, 2012

David J. Kappos
*Director of the United States Patent and Trademark Office*